US011877375B2

(12) United States Patent
Goldstein et al.

(10) Patent No.: US 11,877,375 B2
(45) Date of Patent: Jan. 16, 2024

(54) GENERATING STRONG MAGNETIC FIELDS AT LOW RADIO FREQUENCIES IN LARGER VOLUMES

(71) Applicant: AMF Lifesystems, LLC, Auburn Hills, MI (US)

(72) Inventors: Robert C. Goldstein, Grand Blanc, MI (US); Valentin Nemkov, White Lake, MI (US)

(73) Assignee: AMF LIFESYSTEMS, LLC, Auburn Hills, MI (US)

( * ) Notice: Subject to any disclaimer, the term of this patent is extended or adjusted under 35 U.S.C. 154(b) by 412 days.

(21) Appl. No.: 15/428,229

(22) Filed: Feb. 9, 2017

(65) Prior Publication Data

US 2018/0014365 A1 Jan. 11, 2018

Related U.S. Application Data

(60) Provisional application No. 62/358,690, filed on Jul. 6, 2016.

(51) Int. Cl.
*H05B 6/44* (2006.01)
*H05B 6/04* (2006.01)
(Continued)

(52) U.S. Cl.
CPC ................. *H05B 6/44* (2013.01); *H05B 6/04* (2013.01); *H05B 6/06* (2013.01); *H05B 6/105* (2013.01); *H05B 6/108* (2013.01)

(58) Field of Classification Search
CPC . H05B 6/44; H05B 6/04; H05B 6/105; H05B 6/108; H05B 6/06
(Continued)

(56) References Cited

U.S. PATENT DOCUMENTS 4,092,509 A * 5/1978 Mitchell ................. H02M 5/27 219/625
4,323,748 A * 4/1982 Likins .................... H05B 6/102 219/656

(Continued)

FOREIGN PATENT DOCUMENTS

CN 104770059 A 7/2015
EP 2232947 A2 9/2010

(Continued)

OTHER PUBLICATIONS

Treatment of Malignant Gliomas with Interstitial Irradiation and Hyperthermia; Int. J. Radiation Oncology Biol. Phys; vol. 24, pp. 657-667; 1992.

(Continued)

*Primary Examiner* — Quang T Van
(74) *Attorney, Agent, or Firm* — Fishman Stewart PLLC

(57) ABSTRACT

An apparatus includes a plurality of induction coils that are magnetically coupled to one another, a plurality of heat stations, each respectively coupled to one of the induction coils, a power source, and a power source connected to at least one of the heat stations via at least one power transfer component. When electrical power is applied from the power source to at least one of the heat stations, a magnetic field is induced in the plurality of induction coils via the at least one of the heat stations that is connected to the power source.

38 Claims, 5 Drawing Sheets

(51) Int. Cl.
*H05B 6/10* (2006.01)
*H05B 6/06* (2006.01)

(58) Field of Classification Search
USPC ................................ 219/670–671, 661, 672
See application file for complete search history.

(56) References Cited

U.S. PATENT DOCUMENTS 4,886,952 A * 12/1989 Horiuchi .................. H05B 6/04 219/661
5,250,777 A * 10/1993 Fishman ............... F27B 14/061 219/619
5,784,713 A * 7/1998 McMahan ................. G06F 9/32 711/201
6,274,857 B1 * 8/2001 Loveless .................. C21D 9/30 219/639
6,399,929 B1 6/2002 Tanton et al.
6,538,239 B1 * 3/2003 Anderson ................ H05B 6/02 219/635
6,575,893 B2 6/2003 Feucht
6,618,426 B1 9/2003 Ernst
6,897,756 B2 * 5/2005 Haisch .................... H02J 5/005 336/130
2004/0178680 A1 9/2004 Fishman et al.
2008/0052059 A1 * 2/2008 Kim .................... H02J 13/0017 703/13
2008/0063025 A1 3/2008 Fishman et al.
2008/0297154 A1 * 12/2008 Otake .............. G01R 33/34046 324/318
2012/0019316 A1 * 1/2012 Hattersley ................ H05B 6/06 327/581
2012/0199579 A1 8/2012 Pateau et al.
2014/0008356 A1 1/2014 Uchida et al.
2015/0289321 A1 * 10/2015 Uchida ............... H02M 5/4585 219/662

FOREIGN PATENT DOCUMENTS

JP 2002538586 A 11/2002
JP 2012048962 A 3/2012
RU 2375722 C1 12/2009
WO 2009067456 A2 5/2009

OTHER PUBLICATIONS

Practical Induction Heating Coil Designs for Clinical Hyperthermia with Ferromagnetic Implants, P. R. Stauffer IEEE Transactions on Biomedical Engineering, vol. 41, No. 1, Jan. 1994.
Magnetic Nanoparticles for Cancer Therapy, A. Jordan, M. Etheridge, J. Bischof.
Will We Be Able to Crogenically Freeze Organs One Day? By: Susan Scutti, CNN.
With Iron Nanoparticles, Cryopreserved Tissue Springs Back to Life. By: Nathaniel Scharping Mar. 1, 2017.
Improved Tissue Cryopreservation Using Inductive Heating of Magnetic Nanoparticles; Science Translational Medicine, vol. 9, Issue 379, eaah4586 Mar. 1, 2017; Navid Manuchehrabadi et al.
Treatment of Malignant Gliomas with Interstitial Irradiation and Hyperthermia; Radiation Oncology Biology Phys; vol. 24, pp. 657-667; 1992.
Extended European Search Report dated Jan. 29, 2020 for copending European Application No. EP17824807.
Japan Office Action dated Jul. 19, 2021 for copending Japan Application No. JP2018-569028 (with English translation).
Chinese Office Action dated Mar. 31, 2022 for copending Chinese Application No. 201780041485.0 (with English translation).

* cited by examiner

GENERATING STRONG MAGNETIC FIELDS AT LOW RADIO FREQUENCIES IN LARGER VOLUMES

CROSS-REFERENCE TO RELATED APPLICATIONS

This application claims priority to U.S. Provisional Application Ser. No. 62/358,690, filed Jul. 6, 2016, the contents of which are incorporated by reference in its entirety.

TECHNICAL FIELD

The disclosure relates to the generation of strong magnetic fields over relatively large volumes in the low radio frequency ("RF") range for applications such as magnetic fluid hyperthermia, RF hyperthermia, thermal ablation and plastic welding.

BACKGROUND

The use of alternating magnetic fields in the low radio frequency range is becoming a more popular technique for applications where selective heating of bodies with low equivalent electrical conductivity is desired. These applications include, but are not limited to, magnetic fluid hyperthermia, RF hyperthermia, plastic welding with embedded magnetic bodies, and thermal ablation. In the past, these applications have had limited success due to the ability to generate strong magnetic fields in sufficiently large volumes at the proper frequency to generate sufficient temperatures in the desired areas to produce therapeutic or technological effects.

In various applications, an induction coil, which can have many configurations, carries an alternating frequency current. This current generates an alternating magnetic field, which in turn, induces eddy currents in electrically conductive bodies and generates intensive hysteretic heating of magnetic bodies that are exposed to the alternating magnetic field. The amount of eddy current heating depends upon such factors that include but are not limited to the shape of the induction coil, the strength and frequency of alternating magnetic field, the shape of the conductive body, the orientation of the conductive body relative to the magnetic field, and the electrical and magnetic properties of the body. Controlled, selective eddy current heating is the desirable outcome of the magnetic field exposure for RF hyperthermia and some thermal ablation applications.

The alternating magnetic field also causes hysteretic heating in magnetic bodies exposed to it. The distribution of hysteretic heating depends upon such factors that include but are not limited to the shape of the induction coil, the level of alternating magnetic field, the orientation of the magnetic field relative to the magnetic body, the concentration of the magnetic bodies in an area, and the magnetic properties of the bodies. Controlled, selected hysteretic heating is the desirable outcome of the magnetic field exposure for some thermal ablation and some magnetic fluid hyperthermia applications.

For very small magnetic bodies, such as magnetic nanoparticles, the amount of power that they absorb when exposed to an alternating magnetic field does not match well to traditional models for heating of larger magnetic bodies. New models for describing this behavior have been proposed, but additional work is ongoing, as the mechanisms are not fully understood. Experiments therefore remain the most reliable method for characterization of heating of nanoparticles in an alternating magnetic field. The amount of heat per gram of magnetic material in these very small bodies is referred to as the Specific Absorption Rate, or SAR, in the field of magnetic fluid hyperthermia. The SAR and resulting heating effect in magnetic fluid hyperthermia applications depends upon such things that include but are not limited to the shape of the induction coil, the level and frequency of alternating magnetic field, the orientation of the magnetic field relative to the magnetic body, the size of the magnetic bodies, the concentration of the magnetic bodies in an area and the magnetic properties of the bodies. Controlled, selected heating of these very small magnetic bodies is the desirable outcome of the magnetic field exposure for some thermal ablation and some magnetic fluid hyperthermia applications.

Over the past few decades, there have been several successful in-vitro and in-vivo small animal studies (mouse and rat) performed using magnetic fluid hyperthermia for the purpose of cancer treatment. These studies have shown that non-toxic concentrations of iron oxide particles coated with dextran exposed to magnetic fields with strengths of 30 to around 1300 Oersted (Oe) at frequencies of 50-400 kHz over periods from several seconds to tens of minutes produced sufficient temperature rises in tumors or cancer cells relative to the healthy surrounding tissues in order to produce a therapeutic effect. The particles were delivered to the tumor either by direct injection or antibody guided. The elevated tumor temperatures resulted in tumor growth rate decline, tumor shrinkage, complete tumor cessation, or significant sensitization of the tumor tissue to subsequent radiation treatment. The side effects of the successful treatments were significantly less than for alternative methods.

In the studies described above, the induction coils used produced the proscribed magnetic field strengths in volumes from tens of cubic centimeters to hundreds of cubic centimeters. In these cases, it was possible to properly select the number of turns of the induction coil to match to the output characteristics of high frequency induction heating power supplies using heat stations with components that are readily available and typically off-the-shelf (e.g., capacitors, transformers, inductors, etc.). The power for these applications ranged from a few kilowatts up to tens of kilowatts. The reactive power ranged from several tens of kVAR up to a few MVAR (wherein the term VAR is in units of 'volt-ampere reactive' as used in the power transmission industry).

For treatment of deep seated tumors in larger animals or humans, however, it will be desirable to generate these strong magnetic fields in much larger volumes (several thousand to tens of thousands of cubic centimeters). Often, the desired active power (ignoring any power losses in the animal or human body) is approximately proportional to the internal surface area of the induction coil. Induction heating power supplies for this frequency range are capable of delivering several hundred kilowatts to over a megawatt if properly tuned and conditioned. These power supplies may be modified to meet the needs of the magnetic fluid hyperthermia industry.

The reactive power that may be associated with the magnetic field is approximately proportional to the volume inside of the induction coil in most cases. This means that reactive powers will need to be several MVAR up to potentially over 100 MVAR. This level of reactive power creates significant challenges for the design of heat stations due to the available components. Film based capacitors are limited in voltage and ceramic based capacitors are limited in current. Standard and close-to-standard heat stations are not capable of providing these levels of reactive power in a reasonable size and efficiency.

Thus, there is a need to improve the capability to deliver reactive power for applications where selective heating of large bodies is desired.

SUMMARY

An apparatus has multiple inductors connected to individual heat stations that are fed by a common power source. The inductors magnetically interact with each other to generate high amplitude alternating magnetic fields.

DETAILED DESCRIPTION

The above-described challenges may be resolved for relatively high reactive powers (such as 20 MVAR, as an example) by designing a set of heat stations that are connected in parallel and fed by a common induction heating power supply. Each of the heat stations includes its own individual induction coil to, for instance, limit any risks associated with possibly insufficient electrical contact on the high current output leads due to mechanical tolerances between all of the components. The induction coils may be connected to each other through primary or secondary physical contact or through magnetic coupling. In one example, 20 MVAR may be accomplished using four heat stations at 5 MVAR each, as an example, but other arrangements may accomplish the desired reactive power according to the disclosure.

Thus, disclosed in general is a modular apparatus that separates a desired reactive power into manageable values for an apparatus used to deliver reactive power to relatively large bodies. These modules work in a coordinated manner to deliver a desired magnetic field distribution in a volume of interest.

Figure 1:
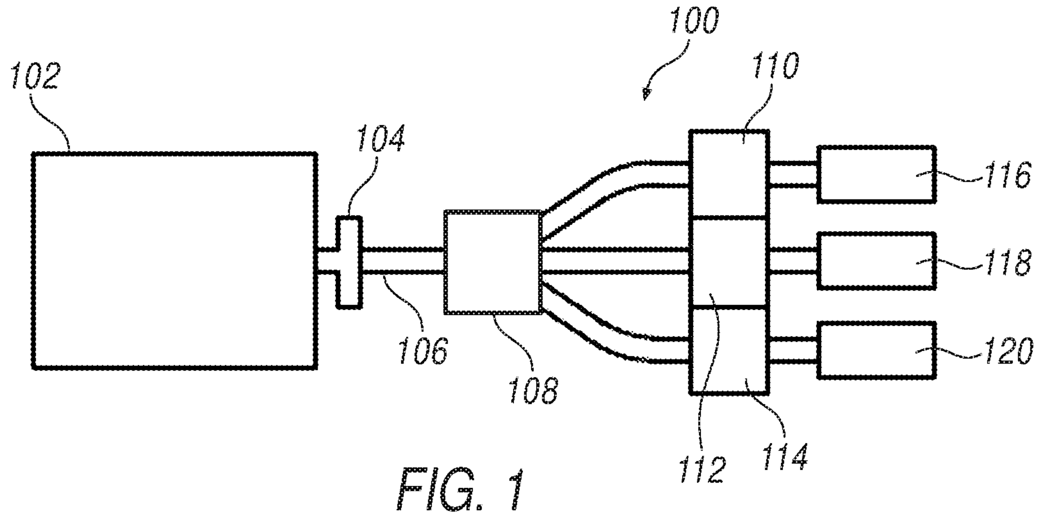
FIG. 1 is a schematic drawing showing a power source, heat stations, and coils according to one exemplary design.

FIG. 1 is an example of a modular design of a system 100 that includes a power supply 102, a power supply buss 104, and a power cable 106. Power supply buss 104 is shown in this and subsequent examples, but is optional, a power transfer components such as power cable 106 may be directly connected to power supply 102. A heat station buss 108 distributes power to each of three heat stations 110, 112, 114, which are respectively coupled to induction coils 116, 118, 120, according to one exemplary design. Alternatively, the power cable 106 and heat station buss 108 are optional and the power supply buss 104 could connect directly to the heat stations 110, 112, 114. The only requirement is that there is an ability to transfer power between the power supply and at least one of the heat stations. Although three induction coils 116, 118, 120, are illustrated, it is contemplated that any number of induction coils may be employed according to the disclosure, such that mutual inductance occurs therebetween.

Mutual inductance between induction coils 116, 118, 120 balances voltage therebetween to compensate for inherent variations in input voltage drop associated with the different capacitance values desired for compensating for central versus outer coils. Also, while three heat stations are shown in the exemplary implementation, any number of heat stations may be used. For instance, two, three, four, or more heat stations may be used. In another exemplary implementation, multiple capacitor battery modules may be housed within a single heat station having multiple outputs.

Accordingly, disclosed is an apparatus that includes a plurality of induction coils 116, 118, 120 that are magnetically coupled to one another, a plurality of heat stations 110, 112, 114, each respectively coupled to one of the induction coils 116, 118, 120, a power source 102 connected to at least one of the heat stations 110, 112, 114. When electrical power is applied from the power source 102, an alternating magnetic field is induced in the plurality of induction coils 116, 118, 120 via the at least one of the heat stations 110, 112, 114 that is connected to the power source 102.

Due to the high mutual inductance of the adjacent inductors in induction coils 116, 118, and 120 being the driving force for energizing the individual coil circuits, mechanical electrical connection physically between all of the heat stations 110, 112, 114 is optional. If a physical electrical connection is used, it can be made on the primary side of the heat stations where currents are substantially lower than in the inductors. Each heat station may have substantially the same magnitude of capacitance relative to one another. In an alternative approach, one or more of the heat stations may have a different capacitance relative to at least one other heat station. This could be used to modify field strength distributions with the same set of inductors.

Thus, according to the disclosure, heat station design is simplified and can be accomplished with existing and available components. That is, due to the mutual inductance between the induction coils, as disclosed herein, each heat station can be proportionately smaller, based on the number of heat station/induction coils that are combined into a single output, as compared to a single coil having one heat station.

Operation of the system, areas of applicability, and provided effects will become apparent from the following disclosure. The specific examples described below indicate illustrative approaches and are intended for purposes of illustration only and are not intended to limit the scope of the disclosure. Thus, the following description of the illustrative approaches is merely exemplary in nature and is in no way intended to limit the disclosure, its application, or uses.

Figure 2:
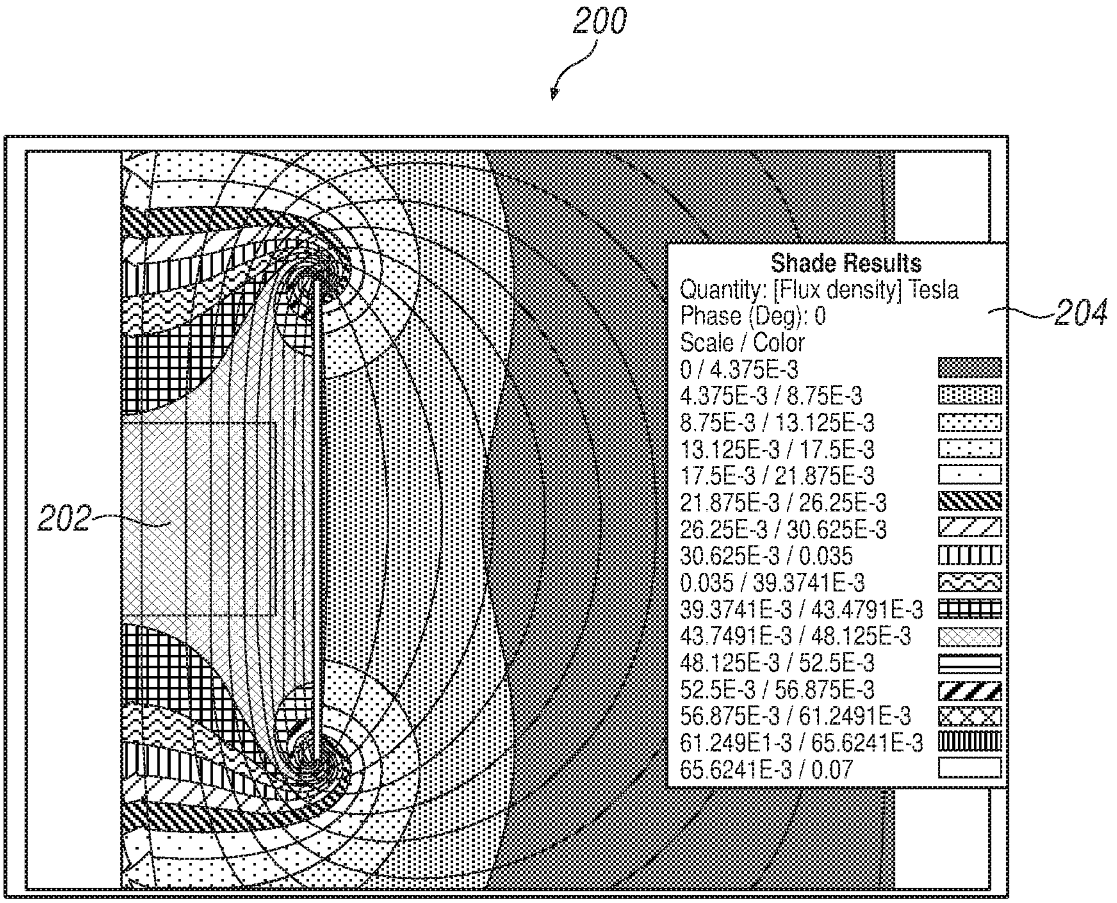
FIG. 2 illustrates a computer simulation of magnetic field strength distribution in a single turn induction coil.

A prototype device was developed to create a magnetic field strength of up to at least 450 Oe magnitude in a volume of at least 20 cm diameter by 10 cm in length at a frequency of approximately 150 kHz. To determine the overall size of the induction coil set and the desired electrical parameters, a single turn coil was modeled using Flux 2D computer simulation program, as illustrated 200 in FIG. 2. When properly sized, a single turn coil (whether round or oval) is the optimal configuration for minimizing the desired reactive and active power in a large, cylindrical volume. The length of the coil was varied to find the most favorable value of the coil to minimize reactive power and maximize field uniformity in a volume of interest 202. The distribution of magnetic field strength is shown in FIG. 2, with the various shaded regions corresponding to a given flux density (in Tesla) as shown in the table 204.

Based upon these calculations, it was determined that the corresponding voltage and current were approximately 1000 Vrms and 10,000 Arms respectively (where Vrms and Arms refer, respectively, to volts and amperes as root-mean-square, as commonly referred to in the industry). This means that total apparent power was approximately 10 MVA, with nearly 100% being reactive power.

A low inductance capacitor rail may be used for each external heat station in the relevant frequency range that has mounting spots for CSP 305A capacitors from, e.g., Celem Corporation. The capacitors on these rails can be configured in one of at least two ways. The first exemplary configuration is to connect all of the capacitors in parallel when used, e.g., for lower voltage applications, such as below 700 Vrms. An alternative configuration includes sets of capacitors connected in parallel with each set having two capacitors in series (with 8 sets in parallel in this example). This alternative approach may be used primarily where the maximum voltage is between 700 and 1400 Vrms.

After selecting a configuration, the minimum number of capacitors for each of the heat stations may be determined. Each CSP305A capacitor is rated for 300 kVAR for continuous use over a certain frequency range. Dividing 10,000 kVAR by 300 kVAR yields a minimum of 34 capacitors of this type. Taking into account some expected additional kVAR from the coil leads and capacitor rails, at least three capacitor rails and resulting heat stations are used in the exemplary approach described herein for full external compensation of the reactive power of the induction system.

In this example, two heat stations could be sufficient for partial compensation of the system reactive power, with the remainder of the capacitance placed in the power supply. However, this could result in additional current in the interconnecting buss bars and the cables connecting power supply to the heat stations, resulting in additional electrical losses and voltage drop. Also, there may be very little room for adjustment and any deviation from the design could result in not achieving the full design specifications and limit the possibility to vary frequency. Therefore, additional external heat stations may be used even though they may not be theoretically not necessary.

Figure 3:
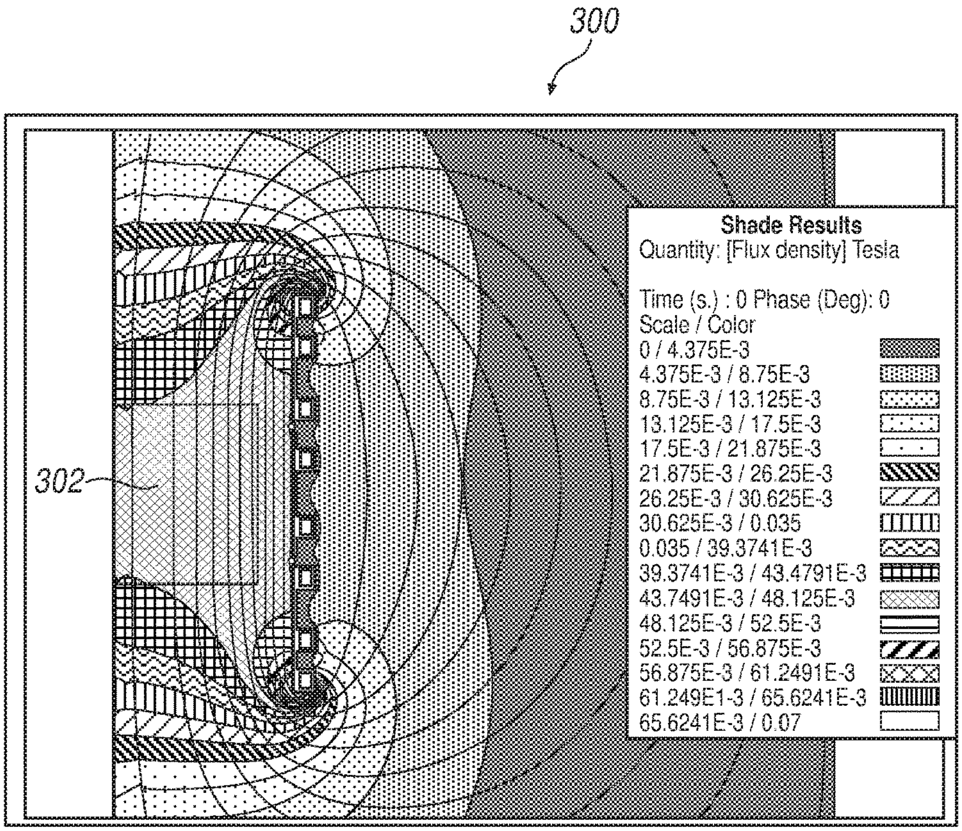
FIG. 3 illustrates a computer simulation of magnetic field strength distribution in a three-piece induction coil set.
Figure 4:
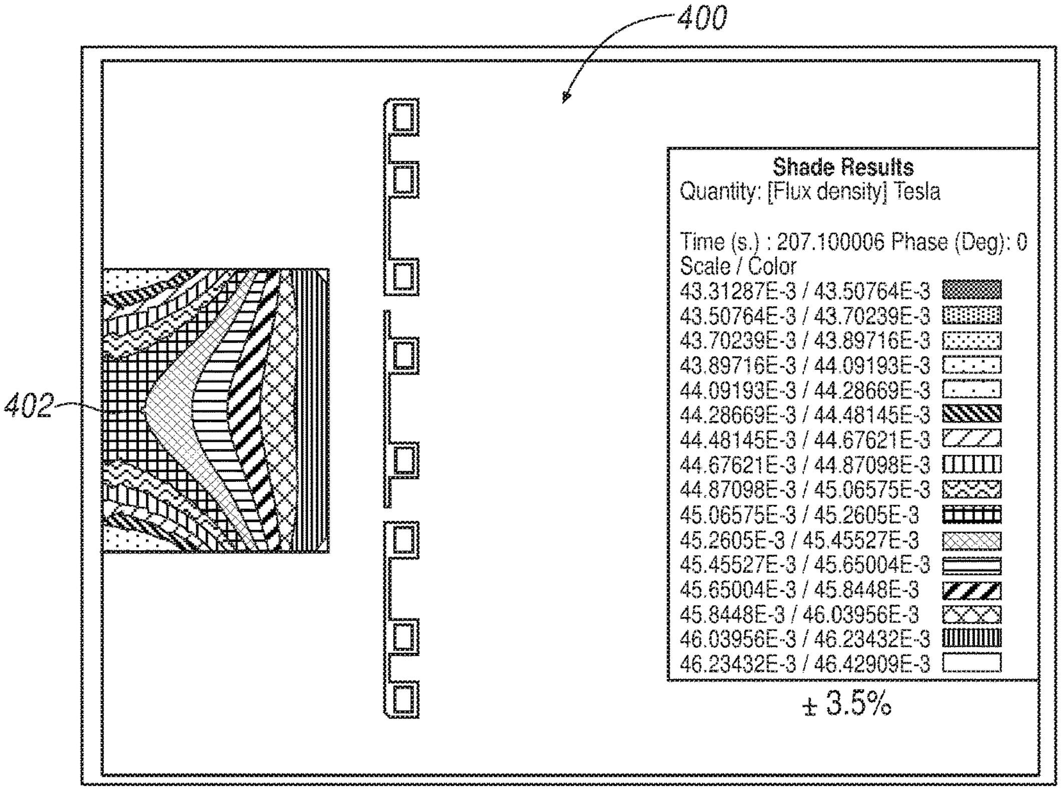
FIG. 4 illustrates the results of FIG. 3 in a volume of interest, showing the near uniform field distribution.

A three-piece coil set 300 was designed using Flux 2D, with predicted magnetic field distribution illustrated in FIG. 3, with each coil cooled with cooling pipes as illustrated (rectangular cooling pipes are illustrated as being thermally coupled to each coil). FIG. 3 illustrates a volume of interest 302, having a generally uniform magnetic field distribution therein. Turn dimensions were varied to achieve the desired magnetic field distribution. The individual turns were designed using copper sheets with copper cooling tubing brazed to them to, e.g., minimize power demand and reactive power, as illustrated therein. Parameters of the 3-coil set and resulting magnetic field distribution are consistent with the single turn system represented in FIG. 2. FIGS. 4 illustrates an exemplary magnetic field 400 in an area of uniformity, which occurs in volume of interest 402, corresponding generally to volumes of interest 202 and 302 of FIGS. 2 and 3, respectively.

After the preliminary calculations were made, the heat stations and coil set were designed, corresponding to the exemplary design of FIG. 1. Efforts were made to minimize the width of the individual heat stations to minimize the length of the coil leads and resulting additional voltage and reactive power compensation.

Calculations showed that the system works with no physical electrical connection between the heat stations, physical electrical contact between the coils on the output side (high current) of the heat stations, or physical electrical contact between the heat stations on the input side (low current) of the heat stations. A common buss on the input side of the heat stations, such as buss 108 of FIG. 1, may help minimize voltage difference on induction coils and limit the potential for variation from the computer models.

The common buss bar 108 was then connected to power supply 102 by a set of flexible cables 106. One high frequency, water cooled low inductance cable may be capable of carrying in excess of 1000 A continuously at 150 kHz with low voltage drop. However, to provide a safety factor in case partial compensation of the heat station was necessary to match to the 80 kW power supply, two high-frequency cables were connected in parallel in this exemplary design, although testing showed that one cable would have been sufficient.

The system was thoroughly tested and measurements of the magnetic field strength distribution were made using a magnetic field probe. The measurements were consistent with the computer simulation values of FIG. 3, and confirmed the device capabilities and design concepts. Thus, the described prototype illustrates that the apparatus functioned as predicted using coils, heat stations, a common buss, an isolator, high-frequency cables, and water lines.

Figure 5:
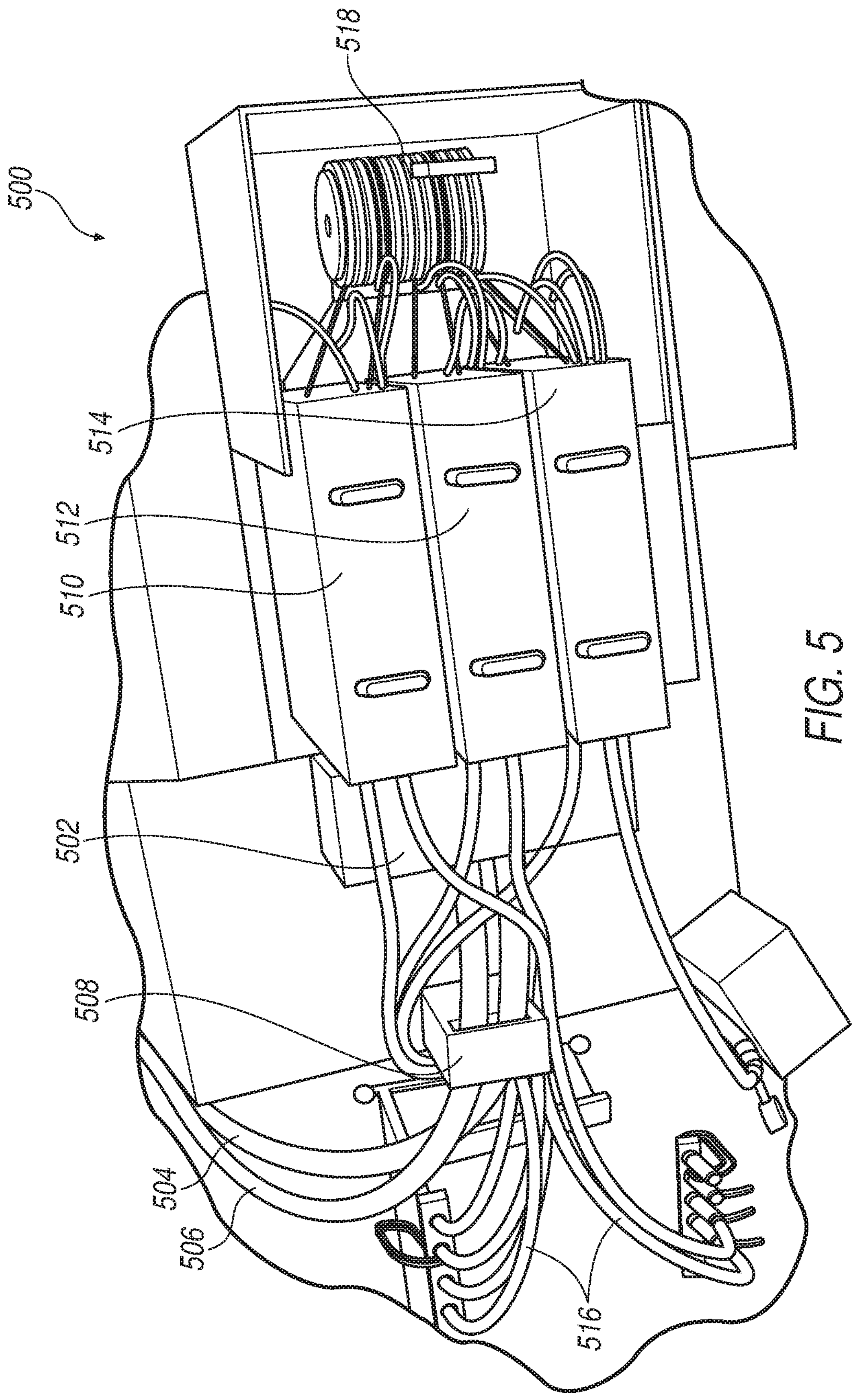
FIG. 5 is an illustrative example of a prototype system.

Referring now to FIG. 5, an illustrative example of a prototype system 500 is, as described, shown therein. System 500 includes a power supply (not shown) connected to a power supply buss 502 via power cables 504, 506. An isolator 508 provides support and is a dielectric material that provides physical support of cables 504, 506. Heat stations 510, 512, and 514 are powered by power supply buss 502, being cooled with water supply lines 516. Coils 518 are illustrated and, although having an appears of a single separate coil, coils 518 are in fact three separate coils along an axial length thereof, each electrically coupled to their respective heat station 510, 512, 514. Coils 518, in the example illustrated, includes three coil structures that are coupled electrically and respectively to heat stations 510, 512, and 514. Coils 518 are schematically illustrated as three coils, for example, as elements 116, 118, and 120 in FIG. 1.

Other exemplary implementations are contemplated as well. For example, one or more capacitor modules may be disposed within a common housing or container. Therefore, an implementation using one heat station having multiple outputs is further contemplated.

Accordingly, the volumes of interest 202, 302, 402 thereby provide a uniform and sufficient magnetic field flux that provide sufficient heating therein, to magnetic particles or bodies that are positioned for thermal ablation or magnetic fluid hyperthermia applications.

As described, heat stations may each be directly and electrically coupled to the power supply, or they may be magnetically coupled to one another, having only a limited number of the heat stations physically connected to the power supply. That is, each of the heat stations, being inductors, are passive electrical components that naturally magnetically couple to one another, even if not electrically connected.

Figure 6:
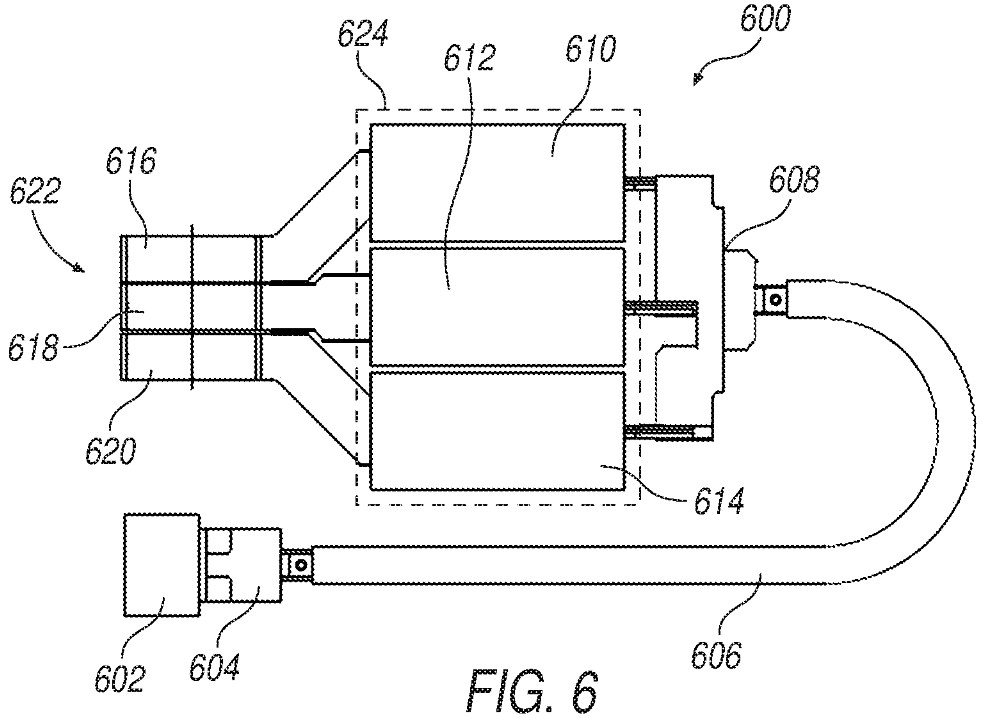
FIG. 6 is a schematic drawing showing a power source, heat stations, and coils according to one exemplary design.

For instance, referring to FIG. 6, a modular design having components as also illustrated in FIG. 1 is illustrated. That is, system 600 includes a power supply 602, a power supply buss 604, and a power cable 606. An optional heat station buss 608 distributes power and is electrically coupled to each of three heat stations 610, 612, 614, which are respectively coupled to induction coils 616, 618, 620, according to one exemplary design. In an alternative, separate power transfer components or power cables may be provided from power supply 602 to each of heat stations 610, 612, 614.

Each of induction coils 616, 618, 620 thereby includes surfaces 622, which correspond generally with the surfaces that shape the flux fields emanating therefrom and to the corresponding volume of interest 302, 402, 502 as illustrated in FIGS. 2, 3, and 4. Further, according to one example, it is contemplated that all heat stations 610, 612, 614 may be all contained within one common container 624, having separate leads leading from each heat station 610, 612, 614 to a respective induction coil 616, 618, 620.

Mutual inductance between induction coils 616, 618, 620 balances voltage therebetween to compensate for inherent variations in input voltage drop associated with the different capacitance values desired for compensating for central versus outer coils. As described with respect to FIG. 1, while three heat stations 610, 612, 614 are shown in the exemplary implementation, any number of heat stations may be used. For instance, two, four, or more heat stations may instead be used.

Due to the high mutual inductance of the adjacent inductors in induction coils 616, 618, and 620 being the driving force for energizing the individual coil circuits, mechanical electrical connection physically between all of the heat stations 610, 612, 614 is optional. If a physical electrical connection is used, it can be made on the primary side of the heat stations where currents are substantially lower than in the inductors. Each heat station 610, 612, 614 may have substantially the same magnitude of capacitance relative to one another. In an alternative approach, one or more of the heat stations may have a different capacitance relative to at least one other heat station. This could be used to modify field strength distributions with the same set of inductors.

Accordingly, rather than having heat station buss 608 electrically coupled to each of heat stations 610, 612, 614, it is contemplated that electrically coupling to only one of heat stations 610, 612, 614 may achieve the same desired effect, according to the disclosure.

Figure 7:
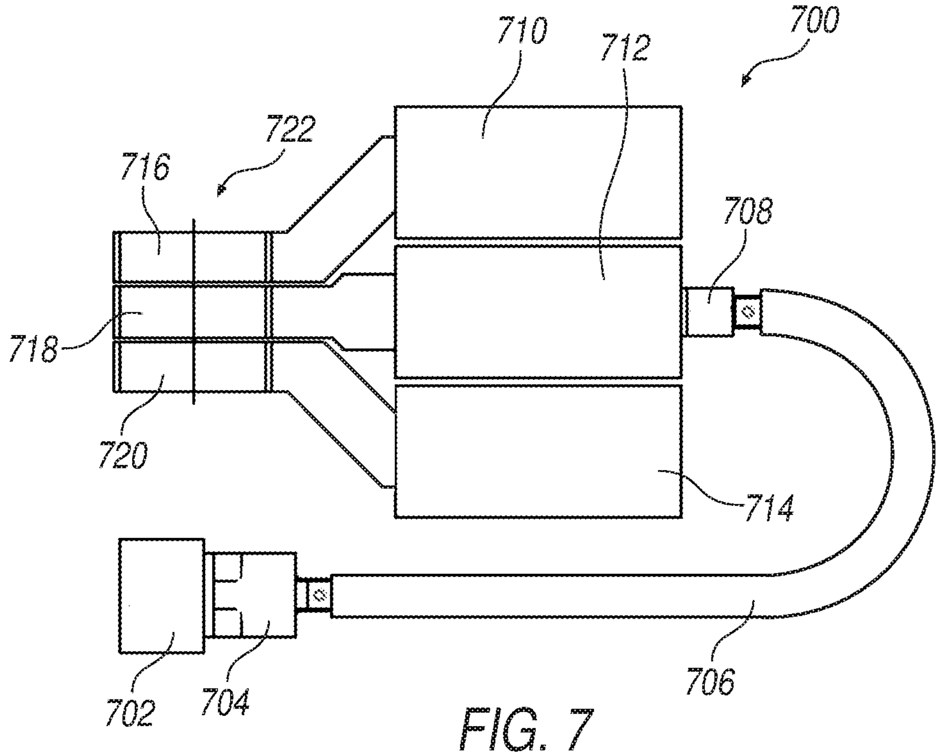
FIG. 7 is a schematic drawing showing a power source, heat stations, and coils according to one exemplary design.

For instance, referring to FIG. 7, system 700 includes a power supply 702, a power supply buss 704, and a power cable 706. An optional heat station buss 708 distributes power and is electrically coupled to one of three heat stations 710, 712, 714, which are respectively coupled to induction coils 716, 718, 720, according to another exemplary design. That is, although power is only provided to heat station 612 from heat station buss 608, magnetic field distribution occurs due to the magnetic coupling between induction coils 716, 718, 720. Thus, each of induction coils 716, 718, 720 thereby includes surfaces 722, which correspond generally with the surfaces that shape the flux fields emanating therefrom and to the corresponding volume of interest 302, 402, 502 as illustrated in FIGS. 2, 3, and 4.

Mutual inductance between induction coils 716, 718, 720 balances voltage therebetween to compensate for inherent variations in input voltage drop associated with the different capacitance values desired for compensating for central versus outer coils. As described with respect to FIG. 1 and as further discussed, while three heat stations 710, 712, 714 are shown in the exemplary implementation, any number of heat stations may be used. For instance, two, four, or more heat stations may instead be used.

Figure 8:
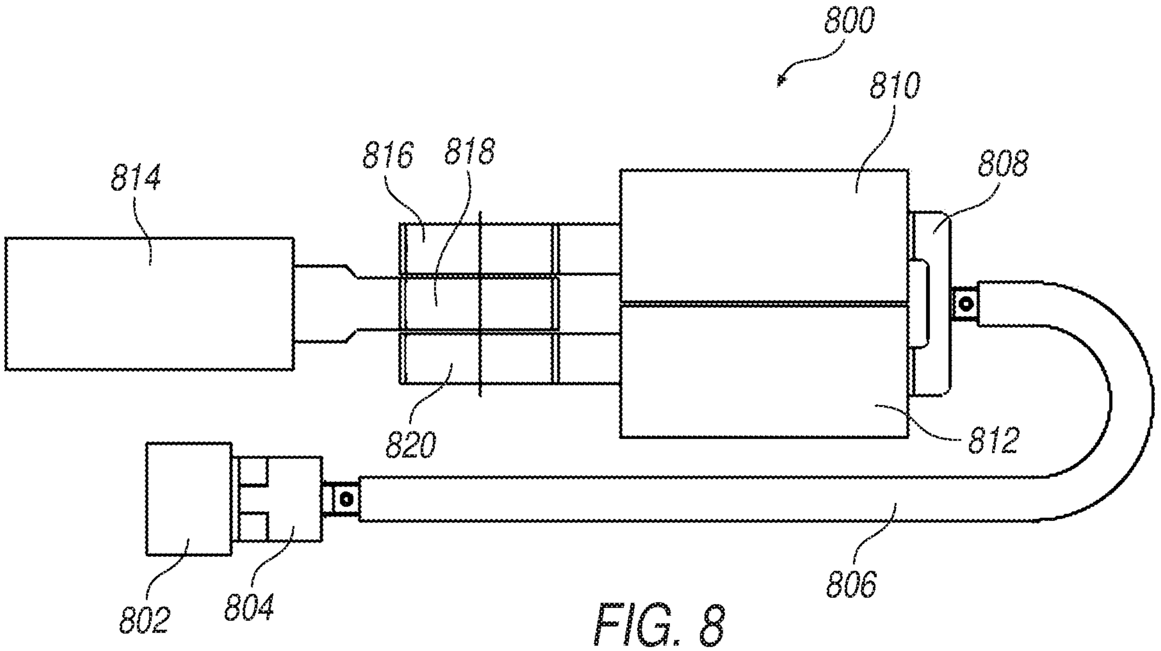
FIG. 8 is a schematic drawing showing a power source, heat stations, and coils according to one exemplary design.

Referring now to FIG. 8, system 800 includes a power supply 802, a power supply buss 804, and a power cable 806. An optional heat station buss 808 distributes power and is electrically coupled to two of three heat stations 810, 812, 814, which are respectively coupled to induction coils 816, 818, 820, according to another exemplary design. That is, although power is only provided to heat stations 810, 812 from heat station buss 808, magnetic field distribution occurs due to the magnetic coupling between induction coils 816, 818, 820. Thus, each of induction coils 816, 818, 820 thereby includes surfaces 822, which correspond generally with the surfaces that shape the flux fields emanating therefrom and to the corresponding volume of interest 302, 402, 502 as illustrated in FIGS. 2, 3, and 4.

Mutual inductance between induction coils 816, 818, 820 balances voltage therebetween to compensate for inherent variations in input voltage drop associated with the different capacitance values desired for compensating for central versus outer coils. As described with respect to FIG. 1 and as further discussed, while three heat stations 810, 812, 814 are shown in the exemplary implementation, any number of heat stations may be used. For instance, two, four, or more heat stations may instead be used.

Figure 9:
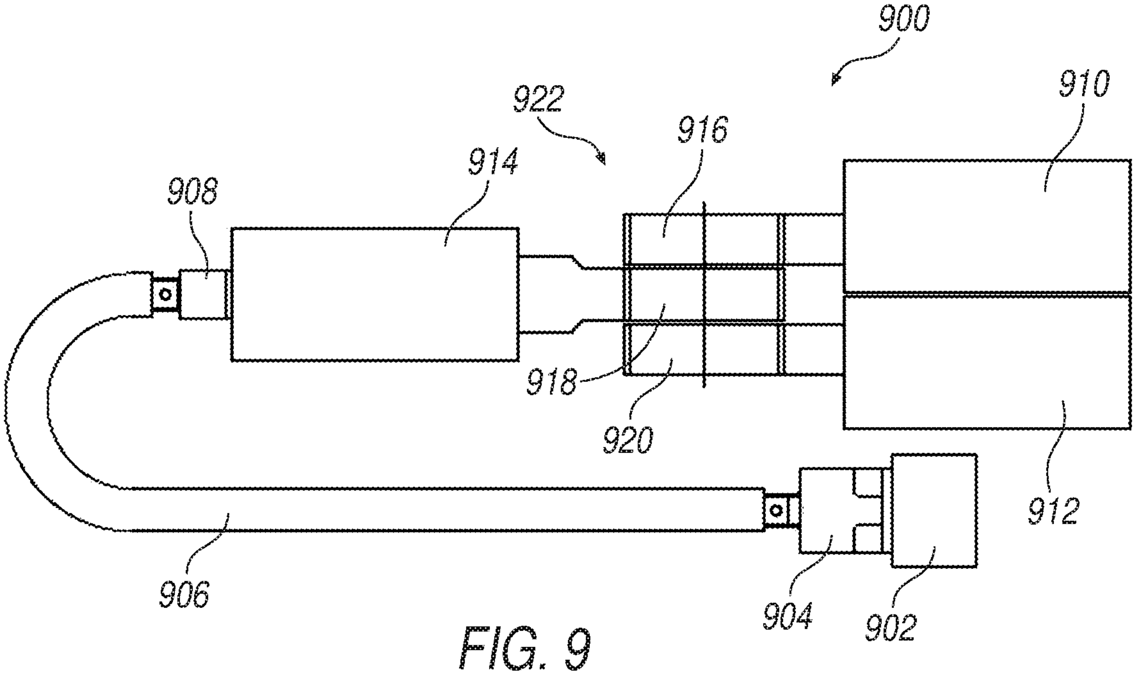
FIG. 9 is a schematic drawing showing a power source, heat stations, and coils according to one exemplary design.

Referring now to FIG. 9, system 900 includes a power supply 902, a power supply buss 904, and a power cable 906. An optional heat station buss 908 distributes power and is electrically coupled to one of three heat stations 910, 912, 914, which are respectively coupled to induction coils 916, 918, 920, according to another exemplary design. That is, although power is only provided to heat station 914 from heat station buss 908, magnetic field distribution occurs due to the magnetic coupling between induction coils 916, 918, 920. Thus, each of induction coils 916, 918, 920 thereby includes surfaces 922, which correspond generally with the surfaces that shape the flux fields emanating therefrom and to the corresponding volume of interest 302, 402, 502 as illustrated in FIGS. 2, 3, and 4.

Mutual inductance between induction coils 916, 918, 920 balances voltage therebetween to compensate for inherent variations in input voltage drop associated with the different capacitance values desired for compensating for central versus outer coils. As described with respect to FIG. 1 and as further discussed, while three heat stations 810, 812, 814 are shown in the exemplary implementation, any number of heat stations may be used. For instance, two, four, or more heat stations may instead be used.

An illustrative method that includes generating a magnetic field that incorporates magnetically coupling a plurality of induction coils to one another, coupling each of a plurality of heat stations respectively to one of the induction coils, providing a power source, connecting the power source and to at least one of the heat stations, and applying electrical power from the power source to at least one of the heat stations, a magnetic field is induced in the plurality of induction coils via the at least one of the heat stations that is connected to the power source.

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed disclosure.

Accordingly, it is to be understood that the above description is intended to be illustrative and not restrictive. Many embodiments and applications other than the examples provided would be upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the disclosure is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. An apparatus comprising:

a plurality of induction coils that are magnetically coupled to one another;

a plurality of heat stations, each respectively coupled to one of the induction coils, the plurality of induction coils and heat stations positioned to provide controlled, selective heating of magnetic nanoparticles;

a single high frequency power supply operating at a low radio frequency that powers all of the plurality of heat stations at the same time, with greater than a non-negligible power to each of the plurality of heat stations, and in a coordinated manner; and power transfer components connected to the single high frequency power supply and connected to at least one of the heat stations;

wherein, when electrical power is applied from the single power source to at least one of the plurality of heat stations, an alternating magnetic field is induced in the plurality of induction coils due to high mutual inductance of adjacent inductors being the driving force for energizing individual induction coil circuits, creating a distribution of magnetic field in a volume of interest via contributions from all of the plurality of induction coils and heat stations for applications where high levels of reactive power is used; and wherein each induction coil of the plurality of coils includes a single turn induction coil.

2. The apparatus as set forth in claim 1, wherein the power transfer components are electrically connected to all of the plurality of heat stations.

3. The apparatus as set forth in claim 1, wherein the power transfer components are electrically connected to only one of the plurality of heat stations.

4. The apparatus as set forth in claim 1, comprising at least three heat stations, wherein the power transfer components are electrically connected to only two of the plurality of heat stations.

5. The apparatus as set forth in claim 1, wherein each of the plurality of heat stations has the same value of capacitance.

6. The apparatus as set forth in claim 1, wherein at least one of the plurality of heat stations has a different capacitance than at least another of the plurality of heat stations.

7. The apparatus as set forth in claim 1, wherein individual heat stations of the plurality of heat stations are connected in parallel by the power transfer components, and wherein at least one heat station is energized by induced voltage from an adjacent induction coil.

8. The apparatus as set forth in claim 1, wherein the number of heat stations corresponds with the number of induction coils.

9. The apparatus as set forth in claim 1, wherein the heat stations are all contained within one common container.

10. The apparatus as set forth in claim 1, wherein each of the plurality of heat stations includes one of a transformer, a capacitor, and an inductor.

11. The apparatus as set forth in claim 1, wherein reactive power is at least several MVAR.

12. The apparatus as set forth in claim 11, wherein the reactive power is 20 MVAR.

13. The apparatus as set forth in claim 11, wherein the reactive power is 5 MVAR in each of the plurality of heat stations.

14. The apparatus as set forth in claim 1, wherein the plurality of heat stations are positioned to provide a uniform magnetic field flux in the volume of interest to heat the magnetic nanoparticles that are positioned within the volume of interest.

15. The apparatus as set forth in claim 1, wherein the magnetic nanoparticles heat for treatment of thermal ablation or magnetic fluid hyperthermia applications.

16. The apparatus as set forth in claim 1, wherein the low radio frequency is in a range of 50-400 kHz.

17. The apparatus as set forth in claim 1, wherein the power transfer components includes at least one of the following components: busses, adapters, cables and heat station busses.

18. A method for generating a magnetic field, comprising:

magnetically coupling a plurality of induction coils to one another, each induction coil of the plurality of induction coils including a single turn induction coil;

coupling each of a plurality of heat stations respectively to one of the induction coils;

positioning the plurality of induction coils and heat stations to provide controlled, selective heating of magnetic nanoparticles;

providing a high frequency induction power supply operating at a low radio frequency that powers all of the plurality of heat stations at the same time, with greater than a non-negligible power to each of the plurality of heat stations, and in a coordinated manner;

connecting a power transfer components to the power source and to at least one of the heat stations of the plurality of heat stations; and inducing an alternating magnetic field in the plurality of induction coils due to high mutual inductance of adjacent inductors being the driving force for energizing individual induction coil circuits; and creating a distribution of magnetic field in a volume of interest via contributions from all of the plurality of induction coils and heat stations for applications where high levels of reactive power is used.

19. The method as set forth in claim 18, wherein connecting the power transfer components further comprises electrically connecting the heat station buss to all of the plurality of heat stations.

20. The method as set forth in claim 18, wherein connecting the power transfer components further comprises electrically connecting the power transfer components to only one of the plurality of heat stations.

21. The method as set forth in claim 18, wherein coupling each of the plurality of heat stations comprises coupling at least three heat stations, further comprising electrically connecting the power transfer components to only two of the plurality of heat stations.

22. The method as set forth in claim 18, wherein each of the plurality of heat stations has the same value of capacitance.

23. The method as set forth in claim 18, wherein at least one of the plurality of heat stations has a different capacitance than at least another of the plurality of heat stations.

24. The method as set forth in claim 18, wherein individual heat stations of the plurality of heat stations are connected in parallel by the power transfer components, and wherein at least one heat station is energized by induced voltage from an adjacent induction coil.

25. The method as set forth in claim 18, wherein the number of heat stations corresponds with the number of induction coils.

26. The method as set forth in claim 18, wherein the heat stations are all contained within one common container.

27. The method as set forth in claim 18, wherein each of the plurality of heat stations includes one of a transformer, a capacitor, and an inductor.

28. The method as set forth in claim 18, wherein reactive power is at least several MVAR.

29. The apparatus as set forth in claim 28, wherein the reactive power is 20 MVAR.

30. The apparatus as set forth in claim 29, wherein the reactive power is 5 MVAR in each of the plurality of heat stations.

31. The method as set forth in claim 18, further comprising positioning the plurality of heat stations to provide a uniform magnetic field flux in the volume of interest, and heating the magnetic nanoparticles that are positioned within the volume of interest.

32. The method as set forth in claim 18, further comprising heating the magnetic nanoparticles for treatment of thermal ablation or magnetic fluid hyperthermia applications.

33. The method as set forth in claim 18, wherein the low radio frequency is in a range of 50-400 kHz.

34. An apparatus comprising:

a plurality of induction coils that are magnetically coupled to one another;

a plurality of heat stations, each respectively coupled to one of the induction coils;

a single high frequency induction power supply operating at a low radio frequency that powers all of the plurality of heat stations at the same time, with greater than a non-negligible power to each of the plurality of heat stations, and in a coordinated manner; and power transfer components connected to the single power source and connected to at least one of the heat stations of the plurality of heat stations;

wherein, when electrical power is applied from the single power source to at least one of the heat stations of the plurality of heat stations, an alternating magnetic field is induced in the plurality of induction coils due to high mutual inductance of adjacent inductors being the driving force for energizing individual induction coil circuits, creating a distribution of magnetic field in a volume of interest via contributions from all of the plurality of induction coils and heat stations for applications where high levels of reactive power is used; and wherein each induction coil of the plurality of coils includes a single turn induction coil.

35. The apparatus as set forth in claim 34, wherein the plurality of induction coils and heat stations are positioned to provide controlled, selective heating of very small magnetic bodies.

36. The apparatus as set forth in claim 35, wherein the plurality of heat stations are positioned to provide a uniform magnetic field flux in the volume of interest to heat the very small magnetic bodies that are positioned within the volume of interest.

37. The apparatus as set forth in claim 35, wherein the very small magnetic bodies heat for treatment of thermal ablation or magnetic fluid hyperthermia applications.

38. The apparatus as set forth in claim 34, wherein the low radio frequency is in a range of 50-400 kHz.

* * * * *